US008292301B1

(12) United States Patent
Gilstad et al.

(10) Patent No.: US 8,292,301 B1
(45) Date of Patent: *Oct. 23, 2012

(54) MULTIFUNCTION RING

(76) Inventors: Dennis W. Gilstad, San Antonio, TX (US); Barbara C. Gilstad, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/525,391

(22) Filed: Jun. 18, 2012

Related U.S. Application Data

(63) Continuation-in-part of application No. 13/456,235, filed on Apr. 26, 2012, and a continuation-in-part of application No. 13/184,965, filed on Jul. 18, 2011, now Pat. No. 8,210,542.

(51) Int. Cl.
*F16J 15/00* (2006.01)
*F16J 15/26* (2006.01)

(52) U.S. Cl. ........ 277/530; 277/553; 277/567; 277/605; 277/645; 277/647

(58) Field of Classification Search .................. 277/530, 277/553, 567, 605, 644–645, 647
See application file for complete search history.

(56) References Cited

U.S. PATENT DOCUMENTS

| | | | |
|---|---|---|---|
| 829,546 A | 8/1906 | Schou | |
| 3,617,589 A | 11/1971 | Jones-Hinton et al. | |
| 3,951,849 A | 4/1976 | Vickery et al. | |
| 4,103,909 A | 8/1978 | Hoffman et al. | |
| 4,269,419 A | 5/1981 | Brant | |
| 4,300,775 A | 11/1981 | Ringel | |
| 4,572,519 A | 2/1986 | Cameron et al. | |
| 4,759,428 A | 7/1988 | Seshimo | |
| 4,852,533 A | 8/1989 | Doncker et al. | |
| 5,183,863 A * | 2/1993 | Nakamura et al. ............ | 525/438 |
| 5,580,068 A * | 12/1996 | Gundy .......................... | 277/605 |
| 5,629,503 A | 5/1997 | Thomasen | |
| 5,639,098 A | 6/1997 | MacDonald | |
| 5,799,953 A | 9/1998 | Henderson | |
| 6,432,320 B1 * | 8/2002 | Bonsignore et al. ............ | 252/70 |
| 6,701,529 B1 | 3/2004 | Rhoades et al. | |
| 6,713,438 B1 | 3/2004 | Baillargeon et al. | |
| 7,608,314 B2 | 10/2009 | Plant | |
| 7,794,827 B2 | 9/2010 | Palmer et al. | |
| 7,847,057 B2 | 12/2010 | Muller et al. | |
| 7,942,603 B2 | 5/2011 | Miller | |
| 2010/0148452 A1 | 6/2010 | Westhoff et al. | |
| 2012/0025471 A1 | 2/2012 | Andrick et al. | |

* cited by examiner

*Primary Examiner* — Vishal Patel
(74) *Attorney, Agent, or Firm* — Dennis W. Gilstad

(57) ABSTRACT

A multifunction ring comprises an elastomeric body which totally encloses at least one circumferential tubular cavity filled with at least one liquid medium. In various ring embodiments the liquid medium conducts heat, damps vibration, blocks extrusion and/or transmits hydraulic pressure. When one or more rings are used in a plunger packing, longitudinal compression of the ring(s) secondary to increased pumped fluid pressure occurs during a pressure stroke. Such compression, acting through the compliance of each ring, increases tubular cavity hydraulic pressure and causes radial ring expansion. Ring expansion is both inward toward a plunger and, simultaneously, outward toward its packing box. Inward expansion tends to seal the extrusion gap, while outward expansion increases coupling from plunger to packing box to increase vibration damping and/or heat scavenging. Periodic reduction of pumped fluid pressure tends to reverse radial ring expansion, thus reducing both frictional ring wear and heat generation.

20 Claims, 3 Drawing Sheets

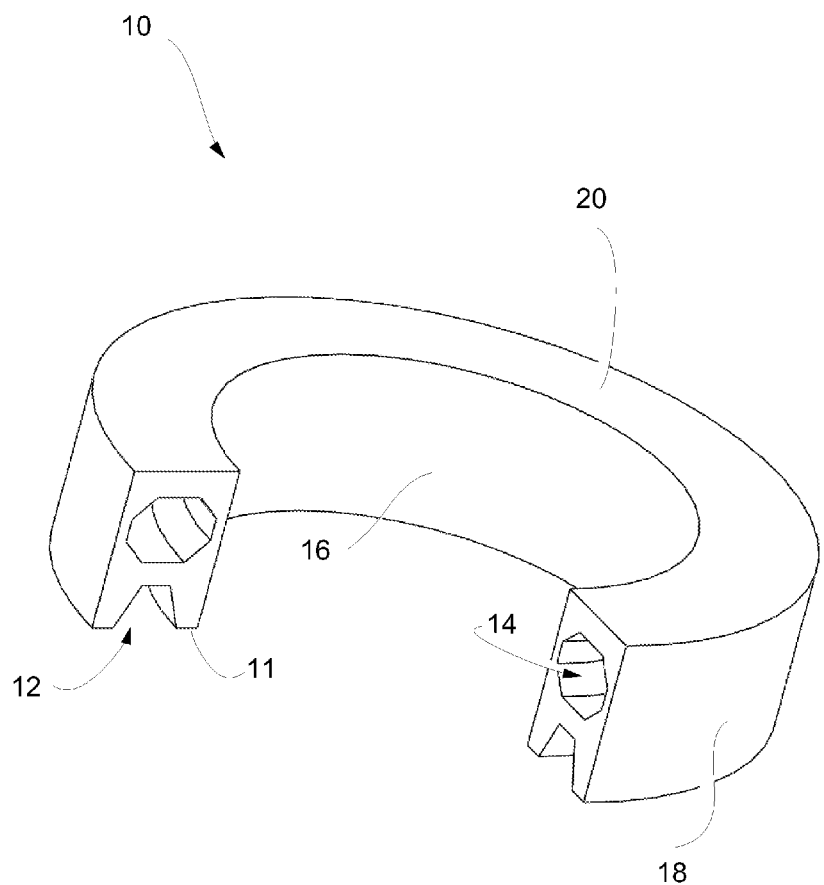
Figure 1

MULTIFUNCTION RING

This application is a continuation-in-part of copending application Ser. No. 13/456,235, filed 26 Apr. 2012, which is a continuation-in-part of copending application Ser. No. 13/184,965, filed 18 Jul. 2011, both applications incorporated by reference.

FIELD OF THE INVENTION

The invention relates generally to reciprocating pumps.

BACKGROUND

Certain pumps, such as those for oil field use, are typically designed in two sections, the (proximal) power section (herein "power end") and the (distal) fluid section (herein "fluid end"). The power end usually comprises a crankshaft, reduction gears, bearings, connecting rods, crossheads, crosshead extension rods, etc. The fluid end of such a pump comprises a housing which in turn comprises one or more functional units, each functional unit comprising a suction valve, a discharge valve, a bore, and a piston or plunger reciprocating in the bore, plus packing assemblies, high-pressure seals, etc.

Conventional plunger pumps employ a housing member (i.e., a packing box) containing plunger packing assemblies analogous to packing assemblies shown in U.S. Pat. No. 4,572,519, incorporated herein by reference and referred to subsequently as the '519 patent. Within a packing assembly one or more packing rings having corresponding chevron-shaped ends are retained and compressed between a proximal brass (or bronze) adapter ring and a distal adapter ring.

The packing rings have chevron-shaped ends (sometimes termed "chevron-shaped packing rings") and are relatively stiff, comprising, for example, layered fabric-reinforced rubber. Each ring end's chevron shape arises from a concave or convex circumferential feature which is an extension of their layered construction, allowing modest radial expansion under longitudinal compression to achieve a tight seal around a plunger. Longitudinal compression force, in turn, is provided by a gland nut and by the cyclically increased pressure of the pumped fluid.

Turning the gland nut adjusts longitudinal preload (i.e., longitudinal compressive force) that is applied to the packing ring(s) to prevent excessive cyclic movement under load and to achieve a desired seal around the plunger. But even after reducing longitudinal preload to zero by backing out the gland nut, packing rings typically remain tightly sealed around the plunger because of their stiffness. Thus, the plunger must virtually always be withdrawn from the packing box to allow removal of the packing ring(s), as may be required during pump maintenance. Plunger withdrawal, however, is generally difficult because of interference between the plunger and various power end components.

The above maintenance issues arise in conventional plunger pumps because designers make the packing rings relatively stiff, while still flexible enough under longitudinal compression to achieve a tight seal around the plunger. Sealing against fluid leakage, however, requires that the packing rings substantially retain their functional (chevron) end shape. Such shape retention becomes progressively more difficult as frictional heat developed during pump operation softens the packing rings and predisposes them to extrusion under pressure through a gap (the extrusion gap) between the proximal adapter ring and the plunger.

A conflict thus arises when packing ring compression is increased. Increased compression may help to improve the plunger seal as well as to reduce migration of the packing ring material through the extrusion gap. But increased compression of the packing rings also results in generation of additional frictional heating that degrades the rings' functional integrity. Since dissipating this heat within the confines of the packing box is difficult, high pressure plunger pumps are often limited to relatively short periods of operation (e.g., no more than a few hours) to limit extrusion of the packing ring material through the extrusion gap. If pump run times are extended, packing rings tend to overheat and fail prematurely.

The above conflict has been partially resolved by replacing the proximal bronze adapter ring with a proximal adapter ring comprising PEEK polymer in certain seals. PEEK (polyetheretherketone) is a high performance thermoplastic, a portion of which moves radially inward under longitudinal compression, tending to narrow the extrusion gap. See, e.g., U.S. Pat. No. 7,847,057 B2, incorporated by reference. Such radial inward (gap-narrowing) movement is termed "elongation" in industry advertising and is said to be more prominent in a PEEK adapter ring than in an analogous bronze adapter ring. While the use of commercially-available PEEK adapter rings appears to increase plunger packing service life, frictional wear and heat generation problems remain.

SUMMARY OF THE INVENTION

A multifunction ring comprises an elastomeric body which totally encloses at least one circumferential tubular cavity substantially filled with a liquid medium. Each liquid medium may comprise various combinations of components (e.g., various oils with or without various types of colloidal particles), all of which are substantially indistinguishable in the schematic illustrations herein. So invention embodiments comprising such components and/or combinations are generally described herein using terminology found in U.S. patents and applications, while being illustrated only schematically. Thus, the schematic representation of "liquid medium" should be understood in each claim and/or description as representing the pertinent terminology used herein and/or analogous terminology incorporated by reference.

Note that the term "liquid" as used herein refers to a substance which generally takes the shape of its container. Since the pressure regime in which the invention may be employed is very wide (i.e., from ambient to about 15,000 psi) and operating temperatures may also vary substantially, a material termed a "liquid" for purposes of the invention might, for example, be semi-solid at ambient pressure while flowing readily at a pressure of 15,000 psi. Thus, terms such as "liquid medium" or "dilatant liquid" or related terms herein refer to substances having useful properties (e.g., viscosity, dilatancy, thermal conductivity, specific heat, etc.) for performance of one or more of the multifunction ring functions [e.g., conducting heat, damping vibration (including shock absorption), blocking extrusion (partially or completely), and/or transmitting hydraulic pressure] under various environmental conditions.

Examples of several multifunction ring functions are seen when one or more rings are incorporated in plunger packing. Longitudinal compression of the multifunction ring(s) secondary to increased pumped fluid pressure occurs during a pressure stroke. Such compression, acting through the longitudinal compliance of each multifunction ring, increases tubular cavity hydraulic pressure and causes radial ring expansion (i.e., a manifestation of radial ring compliance).

In a plunger pump, multifunction ring expansion is both radially inward toward a plunger and, simultaneously, radially outward toward its packing box. Radial inward expansion tends to block the extrusion gap, while radial outward expansion increases coupling from plunger to packing box to increase vibration damping and/or heat scavenging. Periodic reduction of pumped fluid pressure tends to reverse radial ring expansion, thus reducing both frictional ring wear and heat generation.

Note that relatively more effective extrusion blocking and heat transfer functions occur as a pump's pressure stroke increases pumped fluid pressure, when these functions are most needed. Note also that a pump's pressure stroke is typically accompanied by the abrupt closure of its suction valve. This suction valve closure, in addition to generating a rapidly-rising pressure wave in the pumped fluid, also generates substantial pump vibration associated with the impulse of energy released when the suction valve body strikes the suction valve seat.

A multifunction ring as described herein can damp vibration via viscoelastic and/or dilatant components of the liquid medium in each circumferential tubular cavity. See, e.g., U.S. Pat. Nos. 7,794,827 B2; 6,713,438 B1; 5,629,503; and 5,183,863, as well as copending U.S. patent application Ser. No. 13/525,374, all incorporated by reference. Further, the mass of a pump's plunger, when coupled to the pump's housing via certain viscoelastic and/or dilatant components of a multifunction ring, can act as part of a spring-mass vibration damper/shock absorber which is effective over a broad temperature (see the '863 patent).

To assist understanding of the invention, first, second and third embodiments are discussed only as illustrative examples. In a first invention embodiment, a multifunction ring comprises an elastomeric body. The elastomeric body has a body thermal conductivity and totally encloses at least one circumferential tubular cavity. Each circumferential tubular cavity is substantially filled with a liquid medium. That is, a liquid medium, but not necessarily the same liquid medium, substantially fills each circumferential tubular cavity, regardless of the number of tubular cavities. And each such liquid medium has a thermal conductivity which exceeds the body thermal conductivity.

Note that the first invention embodiment specifically addresses thermal conductivities of the elastomeric body and each liquid medium in light of the heat-scavenging function of a multifunction ring. Another function of the multifunction ring (that of vibration damping) may be addressed in variations of the first embodiment by further ensuring that at least one liquid medium comprises at least one dilatant liquid and/or viscoelastic liquid. Candidate dilatant liquids may, for example, comprise one or more particulate and/or fibrous fillers, as well as other materials related to dilatant characteristics (e.g., interpenetrating polymer networks).

Each liquid medium in each first invention embodiment may comprise, for example, one or more oils (see, e.g., the '438 patent), which may additionally comprise nanoparticles (e.g., metallic nanoparticles) to enhance heat transfer. Nanoparticles may comprise, for example, copper, beryllium, titanium, nickel, iron, alloys or blends thereof, and carbon. The term nanoparticle may conveniently be defined as including particles having an average size of up to about 2000 nm. See, e.g., U.S. Pat. No. 6,432,320 B1, incorporated by reference. The first embodiment's elastomeric body may comprise polyaryletherketone (PAEK), for example, polyetheretherketone (PEEK). See, e.g., the '057 patent.

In a second invention embodiment, a multifunction ring comprises an elastomeric body. And the elastomeric body totally encloses at least one circumferential tubular cavity. Each circumferential tubular cavity is substantially filled with at least one liquid medium (meaning filled with either one liquid medium or a combination comprising a plurality of liquid media), regardless of the number of tubular cavities. And at least one liquid medium comprises at least one dilatant liquid.

Each liquid medium of the second invention embodiment may comprise, for example, one or more fillers and oils and, as noted above, may additionally comprise nanoparticles (e.g., metallic nanoparticles) to enhance heat transfer. The elastomeric body may again comprise polyaryletherketone (PAEK), for example, polyetheretherketone (PEEK). See, e.g., the '057 patent.

In a third invention embodiment, a multifunction ring again comprises an elastomeric body, and the elastomeric body again totally encloses at least one circumferential tubular cavity. But in this third embodiment at least one tubular cavity is substantially filled with a cross-graded oil (comprising at least one viscoelastic component and, optionally, nanoparticles). See, e.g., the '438 patent.

Note that variations of the third invention may comprise a plurality of circumferential tubular cavities wherein at least one of the tubular cavities is substantially filled with a dilatant liquid. Thus, variations of the third embodiment address elastomeric bodies having a plurality of tubular cavities wherein the liquid media in at least two tubular cavities differ from each other. In light of the above discussion then, the three invention embodiments described may appear singly or in combination with other embodiments.

Note also that the invention includes a plunger packing assembly comprising at least one multifunction ring of the first, second and/or third embodiment or equivalents thereof, as well as a plunger pump which comprises at least one such plunger packing assembly. Such plunger packing assemblies can thus be tailored to perform optimally in different pressurization environments.

Pressurization of a plunger packing assembly is generally a combination of static and dynamic forces. Static pressurization can result from tightening a packing gland nut, while dynamic pressurization can result from pressurized pumped fluid (e.g., during periodic pump pressure strokes). Either static or dynamic pressurization of plunger packing tends to cause longitudinal compression of the elastomeric multifunction ring(s) present in the plunger packing assembly. The result is uniformly symmetrical radial expansion of one or more multifunction rings against both a plunger and its packing box. Longitudinal compressive force thus applied to the multifunction ring(s) is mediated via any packing ring(s) lying between the multifunction ring(s) and the pumped fluid. Thus the dynamic response of a plunger packing assembly as a whole may be altered by changing the compliance of one or more of the packing rings or multifunction rings and/or their coefficient of friction with the plunger and packing box.

BRIEF DESCRIPTION OF THE DRAWINGS

FIG. 1 is a 3-dimensional partial cross-sectional view of a plunger seal ring schematically illustrating a plane end, a circumferential tubular cavity, and an end having a chevron-shaped (concave) circumferential feature.

DETAILED DESCRIPTION

Figure 2:
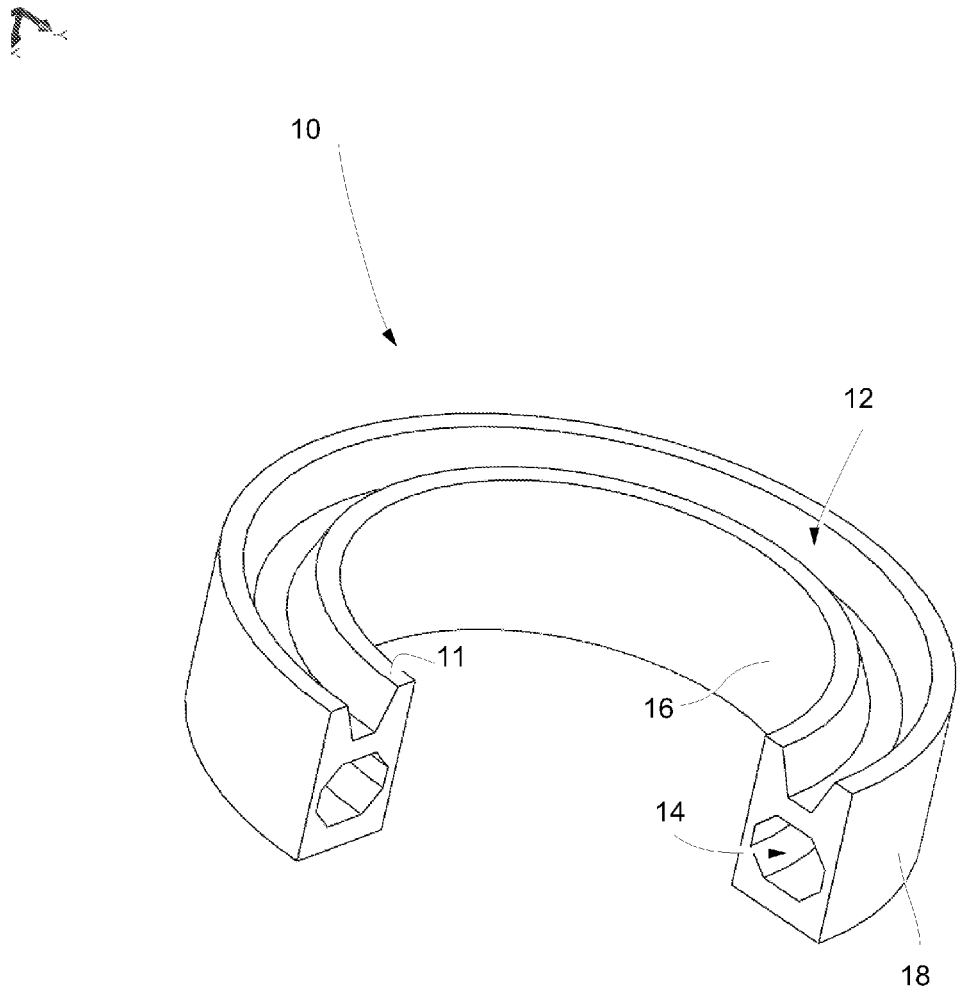
FIG. 2 is an inverted 3-dimensional partial cross-sectional view of the plunger seal ring schematically illustrated in FIG. 1, the view showing the chevron-shaped (concave) circumferential feature more completely.
Figure 3:
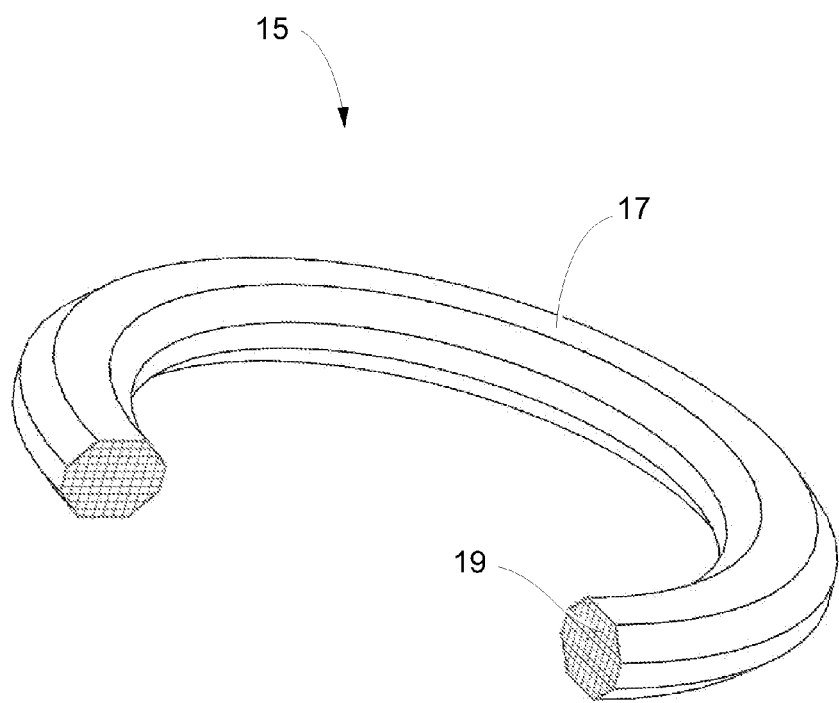
FIG. 3 is an instantaneous 3-dimensional partial cross-sectional view of a fluid medium additionally comprising nanoparticles, the view schematically illustrating that the shape of the fluid medium within the circumferential tubular cavity of FIG. 1 or FIG. 2 closely reflects the shape of the circumferential tubular cavity of FIG. 1 or FIG. 2.

FIGS. 1 and 2 show upright and inverted schematic views of elastomeric body 10 of the multifunction ring of the invention, which is further described below. FIG. 3 refers to a schematic representation of the instantaneous shape of liquid medium 17 as it lies within circumferential tubular cavity 14 of ring 10. Elastomeric body 10 and liquid medium 17, which together comprise a multifunction ring, are shown separately in the drawings to better represent structural details which might be obscured if they were shown together.

Note that the instantaneous spatial configuration 15 of liquid medium 17 as shown in FIG. 3 conforms closely to the interior of tubular cavity 14 as shown schematically in FIGS. 1 and 2. Such close conformation ensures that liquid medium 17 will uniformly transmit hydraulic pressure arising in any portion of tubular cavity 14 (as, for example, resulting from longitudinal compression of ring 10).

In a first invention embodiment, a multifunction ring comprises an elastomeric body 10. The elastomeric body 10 has a body thermal conductivity and totally encloses at least one circumferential tubular cavity 14. Each circumferential tubular cavity 14 is substantially filled with a liquid medium 17. Various embodiments of liquid medium 17 may comprise different combinations of constituents (e.g., oils, particulate fillers, fibrous fillers, metallic particles, interpenetrating polymer networks, etc.) which facilitate functions of a multifunction ring described herein. In general, different embodiments of liquid medium 17 may thus occupy two or more circumferential tubular cavities in a single multifunction ring. And each embodiment of liquid medium 17 has a thermal conductivity which exceeds the body thermal conductivity.

In a second invention embodiment, a multifunction ring again comprises an elastomeric body 10. And the elastomeric body 10 again totally encloses at least one circumferential tubular cavity 14. Each circumferential tubular cavity 14 is again substantially filled with a liquid medium 17, meaning that the same liquid medium substantially fills each circumferential tubular cavity, regardless of the number of tubular cavities. And the liquid medium comprises at least one dilatant liquid.

In a third invention embodiment, a multifunction ring again comprises an elastomeric body 10, and the elastomeric body again totally encloses at least one circumferential tubular cavity 14. But in this third embodiment at least one tubular cavity is substantially filled with a cross-graded oil (comprising at least one viscoelastic component and, optionally, nanoparticles).

In a first alternative invention embodiment, a circular elastomeric multifunction ring 10 symmetrical about a longitudinal axis has a first end 11, a second end 20, a cylindrical inner surface 16, a cylindrical outer surface 18, and a totally-enclosed circumferential tubular cavity 14. Tubular cavity 14 contains a liquid medium 17 for transferring heat and for transmitting hydraulic pressure throughout tubular cavity 14. Ring 10 in this embodiment comprises at least one thermoplastic polymer, and tubular cavity 14 is spaced equidistant from inner surface 16 and outer surface 18, and at least first end 11 comprises a chevron-shaped (concave) circumferential feature 12.

The first alternative embodiment's fluid medium 17 may comprise mineral oil to which may be added metallic nanoparticles 19 which are generally invisible to the eye as they are dispersed in a colloidal suspension which is schematically illustrated by the indicated cross-sectional pattern associated with the nanoparticle label 19 in FIG. 3. Nanoparticles 19 comprise, for example, copper, beryllium, titanium, nickel, iron, alloys or blends thereof, and carbon. The term nanoparticle may conveniently be defined as including particles having an average size of up to about 2000 nm. The thermoplastic polymer of ring 10 may comprise polyaryletherketone (PAEK), for example, polyetheretherketone (PEEK).

In a second alternative embodiment of the invention a circular elastomeric multifunction ring 10 is symmetrical about a longitudinal axis and has a first end 11, a second end 20, a cylindrical inner surface 16, a cylindrical outer surface 18, and a totally-enclosed circumferential tubular cavity 14, tubular cavity 14 containing a fluid medium 17 for transferring heat and for transmitting hydraulic pressure throughout tubular cavity 14.

The second alternative embodiment's fluid medium 17 may comprise mineral oil to which may be added metallic nanoparticles 19 (schematically illustrated in FIG. 3 as described above) comprising, for example, copper, beryllium, titanium, nickel, iron, alloys or blends thereof, and carbon. The term nanoparticle may conveniently be defined as including particles having an average size of up to about 2000 nm.

In a third alternative embodiment of the invention a circular elastomeric multifunction ring 10 symmetrical about a longitudinal axis has a first end 11, a second end 20, a cylindrical inner surface 16, a cylindrical outer surface 18, and a totally-enclosed circumferential tubular cavity 14, tubular cavity 14 containing a fluid medium 17 for transferring heat and for transmitting hydraulic pressure throughout said tubular cavity. The first end is plane and the second end comprises a chevron-shaped (concave) circumferential feature 12.

In addition to the first, second and third alternative embodiments, still other alternative invention embodiments exist. For example, a plunger packing assembly may comprise a plurality of elastomeric multifunction rings of the invention interspersed with rubberized fabric or analogous chevron-shaped plunger packing rings. Note that chevron-shaped plunger packing rings as described herein are packing rings having at least one end (and frequently both ends) comprising a substantially convex circumferential feature or a substantially concave circumferential feature.

Such interspersed plunger packing assembly embodiments thus have a plurality of extrusion gaps (i.e., one extrusion gap associated with each elastomeric multifunction ring of the invention) when installed over a plunger in a pump. During a pump pressure stroke, the pumped fluid pressure will then be distributed over the longitudinal dimension of the plunger packing assembly, with partial pressure differentials associated with each extrusion gap and the adjacent rubberized fabric or analogous chevron-shaped packing ring(s). While the total of the instantaneous partial pressure differentials at a given time approximates the total instantaneous pressure of the pumped fluid at that given time, the instantaneous partial pressure differential associated with each extrusion gap will only be a fraction of the total pumped fluid pressure. Thus, the amounts of seal extrusion as well as frictional heating and wear associated with each such extrusion gap within the plunger packing assembly are reduced. Since both heat generation and heat scavenging are distributed over a longitudinal dimension of such a plunger packing assembly as a whole, maximum temperatures experienced by the plunger packing assembly (and corresponding temperature-related damage) are reduced.

Note that an elastomeric plunger packing ring of the invention may be molded in corresponding mating portions which are then laser welded together using techniques well known to those skilled in the art. The mating portions are chosen to reflect the disclosure herein. See, e.g., the '057 patent and U.S. Pat. No. 3,617,589 (incorporated herein by reference). Following the welding step, one or more holes may be drilled to access the interior tubular cavity, with subsequent filling of the tubular cavity with fluid medium and, if desired, nanoparticles. Subsequent welding closure of the drilled access holes will yield a circular elastomeric multifunction ring substantially as described herein.

Note also that the fluid medium within a circular elastomeric multifunction ring of the invention may be maintained (e.g., by temperature control) in a sufficiently solid state during ring fabrication to permit use of rapid-prototyping (i.e., layer-wise) techniques. Such techniques may obviate the fluid-filling step above. See, e.g., the '057 patent and U.S. Pat. No. 3,617,589, incorporated herein by reference.

What is claimed is:

1. A multifunction ring comprising an elastomeric body comprising an inner surface, an outer surface, and first and second ends;
    wherein said elastomeric body has a body thermal conductivity;
    wherein said elastomeric body totally encloses at least one circumferential tubular cavity spaced equidistant from said inner surface and said outer surface;
    wherein each said tubular cavity is substantially filled with a liquid medium;
    wherein said elastomeric multifunction ring comprises at least one thermoplastic polymer;
    wherein at least said first end comprises a chevron-shaped circumferential feature; and
    wherein each said liquid medium comprises a colloidal suspension of metallic nanoparticles for thermal conductivity which exceeds said body thermal conductivity.

2. The multifunction ring of claim 1 wherein at least one said liquid medium comprises at least one dilatant liquid.

3. The multifunction ring of claim 2 wherein at least one said dilatant liquid comprises at least one particulate filler.

4. The multifunction ring of claim 2 wherein at least one said dilatant liquid comprises at least one fibrous filler.

5. The multifunction ring of claim 1 wherein said elastomeric body comprises polyaryletherketone.

6. A plunger packing assembly comprising at least one multifunction ring of claim 1.

7. A pump comprising at least one plunger packing assembly of claim 6.

8. A multifunction ring comprising an elastomeric body comprising an inner surface, an outer surface, and first and second ends;
    wherein said elastomeric body totally encloses at least one circumferential tubular cavity spaced equidistant from said inner surface and said outer surface;
    wherein each said tubular cavity is substantially filled with at least one liquid medium;
    wherein said elastomeric multifunction ring comprises at least one thermoplastic polymer;
    wherein at least said first end comprises a chevron-shaped circumferential feature; and
    wherein at least one said liquid medium comprises a colloidal suspension comprising at least one dilatant liquid.

9. The multifunction ring of claim 8 wherein at least one said dilatant liquid comprises at least one particulate filler.

10. The elastomeric multifunction ring of claim 8 wherein at least one said dilatant liquid comprises at least one fibrous filler.

11. The multifunction ring of claim 8 wherein at least one said dilatant liquid comprises metallic nanoparticles.

12. The multifunction ring of claim 8 wherein at least one said dilatant liquid comprises at least one interpenetrating polymer network.

13. A plunger packing assembly comprising at least one multifunction ring of claim 8.

14. A pump comprising at least one plunger packing assembly of claim 13.

15. A multifunction ring comprising an elastomeric body comprising an inner surface, an outer surface, and first and second ends;
    wherein said elastomeric body totally encloses at least one circumferential tubular cavity spaced equidistant from said inner surface and said outer surface;
    wherein said elastomeric multifunction ring comprises at least one thermoplastic polymer;
    wherein at least said first end comprises a chevron-shaped circumferential feature; and
    wherein at least one said tubular cavity is substantially filled with a colloidal suspension of metallic nanoparticles in cross-graded oil.

16. The multifunction ring of claim 15 wherein each said cross-graded oil comprises a first polymer and a second polymer dissolved in a liquid lubricant basestock of low viscosity, said first and second polymers having differing molecular weights.

17. The elastomeric multifunction ring of claim 15 wherein said cross-graded oil additionally comprises nanoparticles.

18. The elastomeric multifunction ring of claim 15 wherein said elastomeric body totally encloses a plurality of circumferential tubular cavities, and wherein at least one said tubular cavity is substantially filled with a dilatant liquid.

19. A plunger packing assembly comprising at least one multifunction ring of claim 15.

20. A pump comprising at least one plunger packing assembly of claim 19.

* * * * *